(12) United States Patent
Bress et al.

(10) Patent No.: US 7,143,248 B2
(45) Date of Patent: Nov. 28, 2006

(54) SYSTEMS AND METHODS FOR RESTORING CRITICAL DATA TO COMPUTER LONG-TERM MEMORY DEVICE CONTROLLERS

(76) Inventors: Steven Bress, 17917 Wheatridge Dr., Germantown, MD (US) 20874; Mark Joseph Menz, 114 Rawlings Ct., Folsom, CA (US) 95630; Daniel Bress, 17917 Wheatridge Dr., Germantown, MD (US) 20874; Michael James Menz, 1335 Champagne Cir., Roseville, CA (US) 95747

( * ) Notice: Subject to any disclaimer, the term of this patent is extended or adjusted under 35 U.S.C. 154(b) by 325 days.

(21) Appl. No.: 10/765,345

(22) Filed: Jan. 27, 2004

(65) Prior Publication Data

US 2004/0184309 A1 Sep. 23, 2004

Related U.S. Application Data

(60) Provisional application No. 60/443,388, filed on Jan. 29, 2003.

(51) Int. Cl.
*G06F 12/00* (2006.01)

(52) U.S. Cl. ..................................... 711/154; 365/154
(58) Field of Classification Search ................ 711/154; 365/154
See application file for complete search history.

(56) References Cited

U.S. PATENT DOCUMENTS

| 5,481,647 | A * | 1/1996 | Brody et al. | 706/11 |
| 6,195,732 | B1 * | 2/2001 | Adams et al. | 711/156 |
| 6,415,383 | B1 * | 7/2002 | Colegrove et al. | 713/2 |
| 6,651,077 | B1 * | 11/2003 | East et al. | 707/204 |
| 6,681,304 | B1 * | 1/2004 | Vogt et al. | 711/164 |

* cited by examiner

*Primary Examiner*—Matthew Kim
*Assistant Examiner*—Lev Iwashko (57) ABSTRACT

A restoring device provides a means to reset data in a computer long-term storage device's controller, such as hard drives. There is a need to, on occasion, change information on a device's controller. For example to access data on long-term storage devices such as hard drives that is hidden. Accessing this hidden data involves making a change to a device's controller. There is an addition requirement, on occasion, to reset the device's controller to its original state. Our current invention has systems and methods to restore a long-term storage device controller to a previous state.

15 Claims, 9 Drawing Sheets

SYSTEMS AND METHODS FOR RESTORING CRITICAL DATA TO COMPUTER LONG-TERM MEMORY DEVICE CONTROLLERS

RELATED APPLICATION

This application claims priority under 35 U.S.C. § 119 based on U.S. Provisional Application No. 60/443,388, filed Jan. 29, 2003, the disclosure of which is incorporated herein by reference.

BACKGROUND OF THE INVENTION

A. Field of Invention

The present invention relates to computer memory devices, and, more specifically, to mechanisms for restoring critical data to computer memory devices.

B. Description of Related Art

Modern computer long-term memory storage devices, such as, but not limited to IDE drives, are able to "hide" data from their host computer's operating system. For example, an IDE drive might be 12 GB, with 10 GB not hidden and 2 GB hidden. The entire 12 GB of the drive might have data on it, but an operating system, such as Windows®, would only be able to access the non-hidden 10 GB. Special programs that bypass the operating system and address the drive directly may read this "hidden" data.

The commands that allow for hiding of data do not actually change the data stored on a drive, but change how a drive responds to certain commands. For instance, one of the commands reduces the effective size of the drive by making data stored above a certain location inaccessible to the host computer's operating system. In order to avoid confusing the operating system, the drive reports this smaller size as its true size. In order for the operating system to have access to data above this new reported size, a skilled operator would need to reset the drive's size back to its full size and then issue appropriate commands to have the operating system recognize the drive's larger size. These steps require changes to the data in the drive.

One legitimate example of this "hiding" feature being used is a computer manufacturer, such as Hewlett-Packard of Palo Alto, Calif., putting configurations files on a drive but hiding them from users. In this fashion most users are prevented from modifying the configuration files, as they do not have the expertise and/or access to special programs, or the knowledge that there are hidden files on their computer. A manufacturer could copy an operating system installation data to a "hidden" area. Since the manufacturer knows that the operating system is in the "hidden" area, the manufacturer could write a series of utilities to extract drivers and/or other files, which may be needed from time to time. The manufacturer in this case would have a reasonable expectation that these files would be available and unmodified if needed, whereas if the files were in a non-hidden area, the files may be modified and/or deleted through operator error.

Unfortunately, lawbreakers can use this "hidden" feature as well. Pedophiles may store illegal images in the "hidden" area. Terrorists may store their plans in the "hidden" area. Corporate spies may hide confidential data in the "hidden" area. There is an obvious need for Police and other law enforcement as well as security officers to be able to access "hidden" areas on computer long-term memory storage devices.

There are many situations where law enforcement or security officials need to examine and/or copy a storage device and leave it in its original state. If the size reported by an Identify Device request is not reset, the operating system of the original host computer may not be able to access the drive properly. If a suspect's computer suddenly starts malfunctioning in this way, he may be tipped off and modify his behavior. Law enforcement officials may check a suspected and/or paroled pedophile's computer for illegal images. If illegal images are found, law enforcement officials may monitor the suspect's actions in an effort to identify his contacts. Therefore, it is important that the suspect does not know that his computer was searched. Security officers have similar concerns when investigating terrorists and spies.

There are a number of known conventional techniques for restoring critical data to long-term storage devices. One class of early techniques revolves around connecting a storage device to a host computer and running software on the host to open and restore critical data. There are three major problems with these techniques. First, some operating systems, such as the Windows® operating systems from Microsoft Corporation, may modify the storage device when accessing files on the device, even if the user is only trying to read files from the device. In addition, during startup, operating systems such as Windows® will write up to hundreds of megabytes of data to a storage device as the operating system initializes. Secondly, a trained operator is required to properly connect the storage device to a host and run the specialized software. Thirdly the simple act of connecting a storage device to a standard host may damage the device or change its storage state.

There are many situations in which it is desirable to allow data to be read from a non-volatile long-term memory storage device, such as a computer hard drive, but not allow data to be written to the device. For example, law enforcement officials have occasion to confiscate long-term memory storage devices. Once confiscated, the law enforcement officials need to be able to examine and copy the storage device without changing the storage state of the device. Therefore, for the purposes of law enforcement officials and security officers, these techniques are not optimal.

A second class of restoring critical data to drive controllers revolves around the use of a write protecting device, such as our U.S. patent application Ser. No. 09/961,417 and specialized software run on a host computer. The write protecting device protects the storage device from any changes as discussed above. However, a skilled operator is required to run the software.

A third class of restoring critical data to drive controllers revolves around the use of stand-alone devices such as Ser. No. 09/961,417 with a simple user interface. This user interface could show a user critical drive information. A user could then write down this information. This class of device could have a user interface that would enable a user to then enter this information and in this way restore critical data. However, this would make this class of device larger, more expensive, more difficult to use, and open to the possibility of alerting a suspect if the incorrect information is entered.

There are two considerations currently unmet within the art. There is an obvious benefit if a restoring device could indicate to an operator that the drive has been correctly restored. Furthermore, there is an obvious benefit if a restoring device included systems and methods to protect critical data in the event of a power failure.

The above discussion has focused on IDE drives and restoring information reported by an Identify Device command, but our invention is not limited to these. One skilled in the art will appreciate that other drive types, such as USB and FireWire, have similar concerns and that information other than the drive size may need to be restored.

Accordingly, there is a need in the art for an improved mechanism for restoring critical drive information in a memory device, such as a disk drive.

SUMMARY OF THE INVENTION

Systems and methods consistent with the present invention address these and other needs by providing for an operating system independent circuit and logic that is physically connected to a storage device.

One aspect of the invention is directed to a restoring device including a plurality of elements. Specifically, the restoring device includes a processor coupled to an interface and non-volatile memory. The processor issues a command to a storage device, which is connected to the interface and stores all or part of the response in non-volatile memory. The processor then writes to the storage device to enable a host to read data from the entire storage device. Upon receiving a command, (usually automatic/user initiated optionally) the processor writes a command to the storage device to restore the storage device to its previous state.

A second aspect of the invention is directed to a device that includes an IDE interface, and a logic circuit. The IDE interface is configured to engage a cable that connects to the IDE storage device. The logic circuit issues the necessary command(s) to the IDE storage device to determine the IDE storage device's unique identification number and reported drive size (from the Identify Device data packet). The logic circuit stores the IDE storage device's unique identification number in non-volatile memory and; associates the reported drive size from the Identify Device data packet with the unique identification. The logic circuit issues a further command(s) to the IDE storage device to obtain data to allow the logic circuit to analyze the full size of the IDE storage device. The logic circuit issues a command to the IDE storage device to change the drive size in the Identify Device Packet to allow a host machine to read data from the entire IDE storage device. Upon command, the logic circuit will issue a command(s) to the IDE storage device to restore the drive size reported in the Identify Device data packet to its original state.

Yet another aspect of the invention is directed to a computer device. The computer device includes circuitry to act upon long-term storage devices, such as computer hard drives and a restoring device. The restoring device is configured to make changes to the storage device to enable a host computer to read all data stored on the storage device and to subsequently restore the storage device to its original state.

Yet another aspect of the invention is logic and circuitry, which queries a long-term storage device's controller and stores the response in non-volatile memory.

Yet another aspect of the invention is logic and circuitry, which queries a long-term storage device's controller and stores the response in non-volatile memory. The logic and circuitry then determine the proper settings to write to the device's controller to allow all hidden data on the device to be accessible and issue the proper commands.

Yet another aspect of the invention is logic and circuitry, which queries a long-term storage device's controller and stores the response in non-volatile memory. The logic and circuitry then determine the proper settings to write to the device's controller to allow all hidden data on the device to be accessible and issue the proper commands. Upon command the logic and circuitry restore the device's controller to its original state.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention.

A retrieving device is described herein that writes certain commands to a storage device and returns the storage device to its original state. The retrieval device has an interface port through which it can communicate with a long-term memory storage device.

The storage device may be any type of long-term non-volatile memory device. For example, the storage device may be a hard disk drive or compact flash memory. In one implementation, the storage device uses an Integrated Drive Electronics (IDE) interface. An IDE interface is a well-known electronic interface that is frequently used to connect a computer's motherboard and disk drive. In IDE drives, the disk drive controller is built into the physical case of the disk drive. The IDE interface provides a relatively high level interface between the motherboard and the disk drive.

Although concepts consistent with the present invention are primarily described herein in relation to an IDE magnetic hard disk drive, these concepts may be implemented with other types of IDE media, such as flash memory with an IDE interface. Flash memories are a special type of semiconductor random access memory that retains its data after power has been removed from the system. Other types of media useable with an IDE interface include magnetic tape and optical media, such as a compact disc (CD) and a digital versatile disc (DVD). In addition to the IDE interface, concepts consistent with the invention may be applied in a straightforward manner to other types of high level storage interfaces, such as the well known Small Computer System Interface (SCSI) standard, or IEEE 1394 FireWire interface.

For the sake of clarity, the remaining description herein will be described with reference to an IDE magnetic hard drive, although, as mentioned above, the concepts of the invention are not limited to such drives. One skilled in the art would appreciate that other modern long-term storage device interfaces share similar functionality that could be incorporated into the concepts described herein.

Ide Drive

As previously mentioned, communications with an IDE drive occurs through its IDE interface. The IDE interface is a well-defined interface that has addressable memory registers in which the host device (e.g., the computer motherboard) can write commands. The host may also read these registers to, for example, retrieve status information. The IDE interface may additionally include memory used to buffer data going to or coming from the storage media.

An IDE drive returns its size in an IDENTIFY_DEVICE data packet. Operating Systems, such as Windows®, store information on how to access a drive based on this number. Typically this is only done once when the system is powered up. The size in the IDENTIFY_DEVICE packet can be smaller than the full drive size; thereby leaving an area that is hidden from an operating system.

In order for specialized software to read hidden data, commands must be issued to the drive that will "unhide" the data. Once done, standard commands may be used to read the previously hidden data, such as the READ_SECTOR command. In order to have access to all of the hidden data, the drive must be instructed to report its actual size.

In order to determine the true size of an IDE drive and restore it to its original state, first an IDENTIFY_DEVICE Command is issued. This command returns an IDENTIFY_DEVICE data packet. To determine the true size of a drive, we are concerned with three pieces of data in this packet. These are: the reported size of the drive, is MAX_COMMAND available (True/False), and is DEVICE_CONFIGURE available (True/False).

Case One. MAX_COMMAND is false and DEVICE_CONFIGURE is false. The reported size of the drive is the max drive size. There is no hidden area.

Case Two. MAX_COMMAND is true and DEVICE_CONFIGURE is false. The READ_NATIVE_MAX_ADDRESS is issued. If the size reported by the READ_NATIVE_MAX_ADDRESS is larger than the size reported in the IDENTIFY_DEVICE data packet, there is a hidden area. A SET_MAX_ADDRESS command is issued to change the size reported by the IDENTIFY_DEVICE data packet. Later, a SET_MAX_ADDRESS command is issued to restore the drive to its original state.

Case Three. MAX_COMMAND is false and DEVICE_CONFIGURE is true. The READ_NATIVE_MAX_ADDRESS is issued. If the size reported by the READ_NATIVE_MAX_ADDRESS is larger than the size reported in the IDENTIFY_DEVICE data packet, there is a hidden area. A DEVICE_CONFIGURE_SET command is issued to change the size reported by the IDENTIFY_DEVICE data packet. Later, a DEVICE_CONFIGURE_SET command is issued to restore the drive to its original state.

Case Four. MAX_COMMAND is true and DEVICE_CONFIGURE is true. The READ_NATIVE_MAX_ADDRESS is issued. If the size reported by the READ_NATIVE_MAX_ADDRESS is larger than the size reported in the IDENTIFY_DEVICE data packet, there is a hidden area. A SET_MAX_ADDRESS command is issued to change the size reported by the IDENTIFY_DEVICE data packet. If this command generates an error message, then a DEVICE_CONFIGURATION_SET command is issued. Later, if a SET_MAX_ADDRESS command was successfully used to change the state of the drive, the SET_MAX_ADDRESS command is issued to return the drive to its original state. If a SET DEVICE_CONFIGURATION command was successfully used to change the state of the drive, then a DEVICE_CONFIGURATION_SET command is issued to return the drive to its original state.

One skilled in the art will appreciate that similar commands are used when working with "Big" drives.

Device Incorporating Drive Restore Logic and Circuitry

Figure 9:
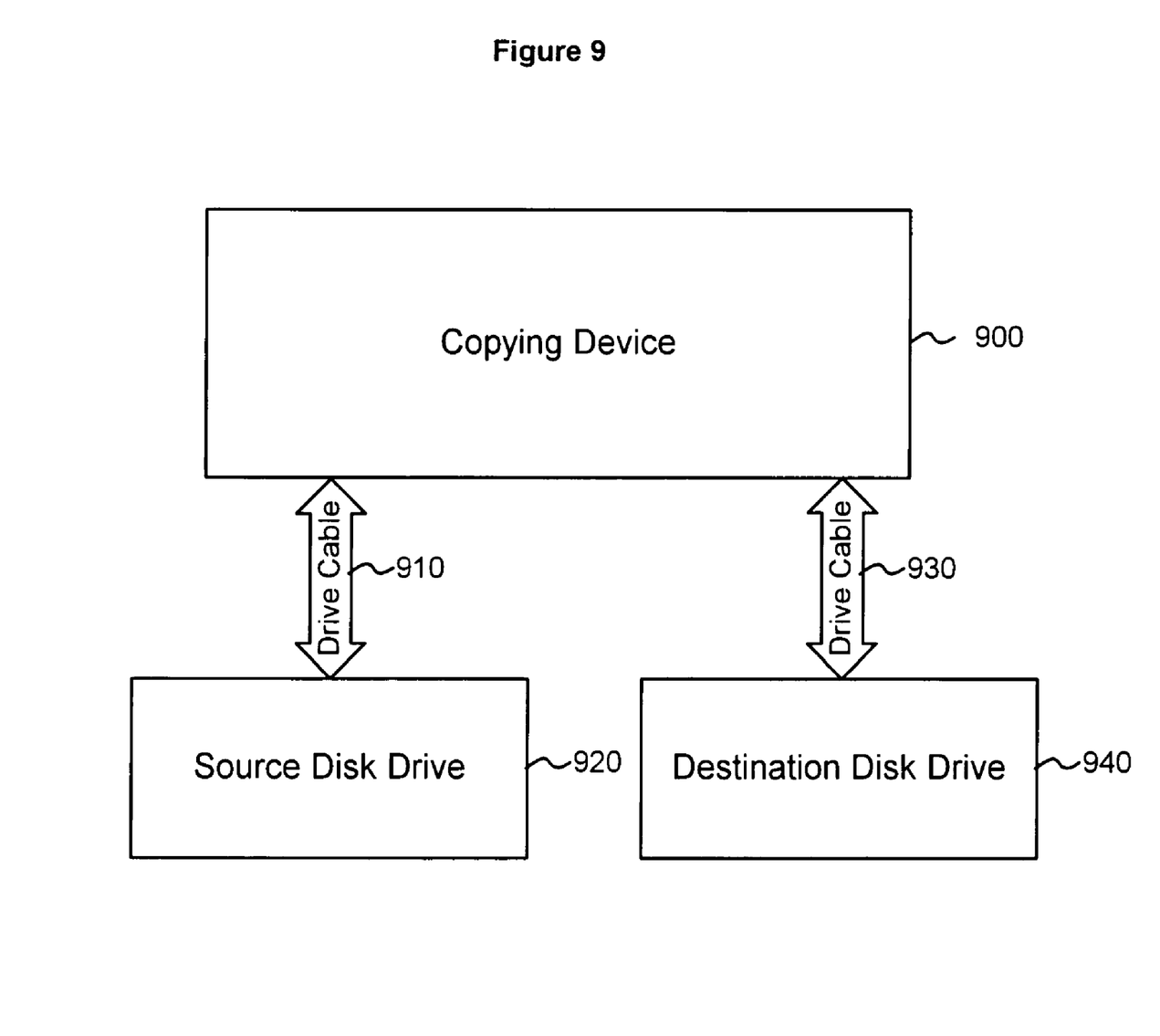
FIG. 9 is diagram illustrating a copying device, which would benefit from our current invention.

FIG. 9 illustrates a Copying Device. A source disk drive 920 is connected to the copying device 900. The copying device performs operations and makes a copy of 920 on a destination disk drive 940. A copying device is just one example of a device that would benefit from our current invention.

Figure 7:
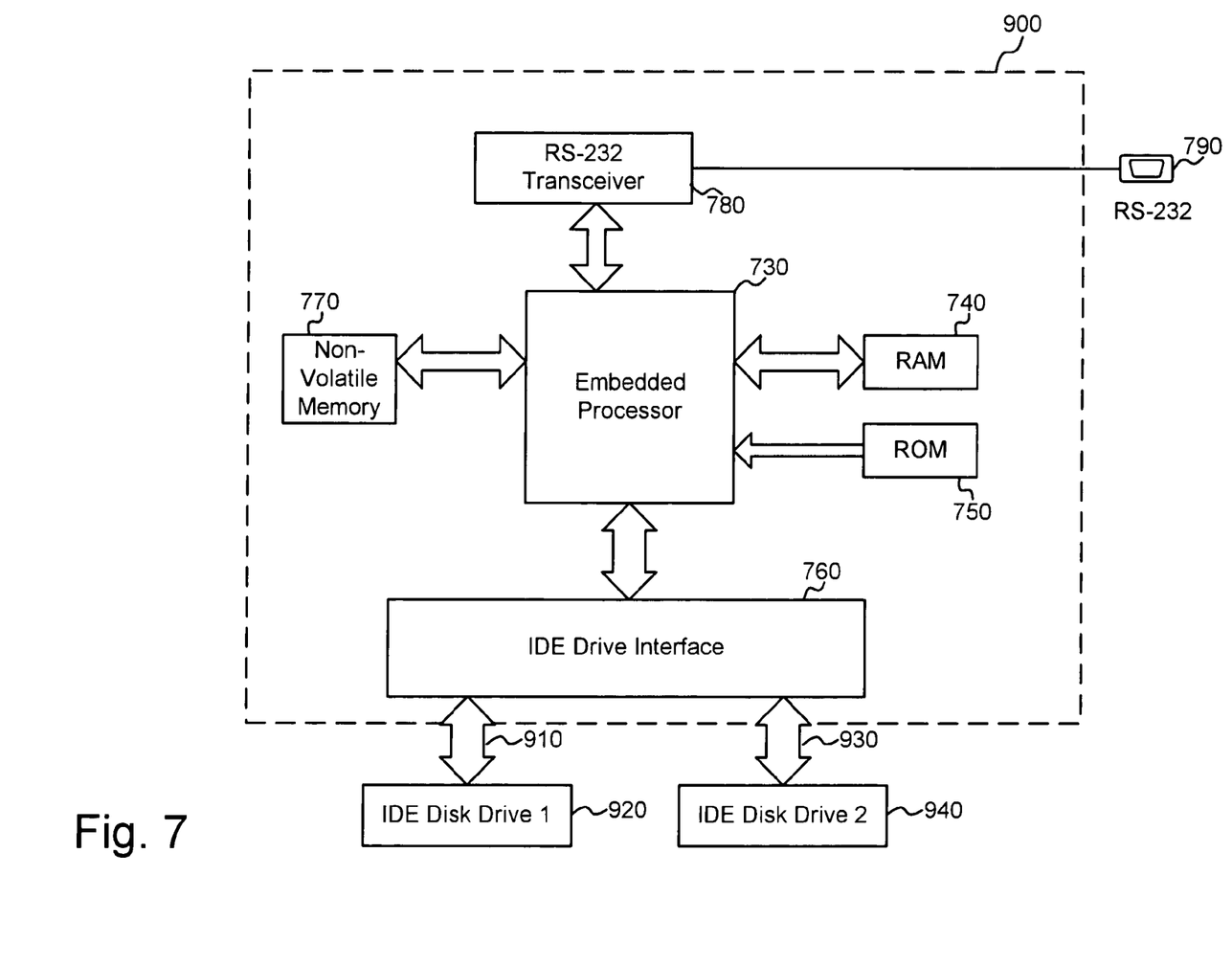
FIG. 7 is a block diagram illustrating the copying device shown in FIG. 9 in more detail, incorporating our current invention.

FIG. 7 shows a block diagram of a drive copying device that incorporates drive restore logic and supporting circuitry. This device 900 can make an exact copy of a Source Drive, 920 Drive 1, on a Destination Drive, 940 Drive 2. In order to copy all of the data present on the Source drive 920, the processor 730 must interrogate the Source Drive 920 and determine if it has any hidden data.

If it is determined that the Source Drive 920 has hidden data, this data must be made available to processor 730 before a full copy can be made to the Destination Drive 940. As described earlier, information about the current configuration, along with unique drive identification information is stored in FLASH RAM 770 before making any changes to the drive. Once this information is stored in FLASH 770, the drive's settings may be changed to expose all of the hidden data.

With this change in drive settings, the processor 730 may initiate the process of copying the drive. Under ideal circumstances, the copy would complete, and the device 900 would set the Source Drive 920 back to its original configuration. In the event of a power failure, an electrical glitch, or some other accidental or intentional mishap with the device, it is possible that the copy process could be interrupted. In this case, the Source drive 920 would not have had the opportunity to be restored to its original settings.

Our invention provides a method for dealing with such a contingency. When device 900 is powered up, it interrogates drive 920 and obtains its unique drive identification number. If 920 was previously attached to device 900 it will be detected as having a recent entry in FLASH. At the end of the copy procedure, the device 900 can restore the drive 920 to its previous settings. Another option would be for device 900 to reset drive 920 to the smallest size settings. Another option would be, if there are multiple entries concerning the Source drive 920, a User may interact with the device using the RS-232 Serial port 790, and instruct the device 900 which entry to use.

A Detailed Look at a Drive Copier Electronic Block Diagram

In a standard configuration, our device is connected to two standard IDE hard drives. A drive containing Source data is connected through a standard cable to Interface Connector 1040. Power for this drive is provided through an industry standard drive power connecter 1070. A drive that will receive a copy of the source data, or Destination Drive, is connected through a standard IDE cable to Interface Connector 1060. Power for this drive is provided through an industry standard drive power connecter 1080.

To a drive, our device appears to be a host computer. The drives are electrically isolated from each other through the use of separate Interface Circuitry for each drive. 1030 for the Source, and 1050 for the Destination. In a standard PC, two IDE drives can share the same interface circuitry.

Figure 5:
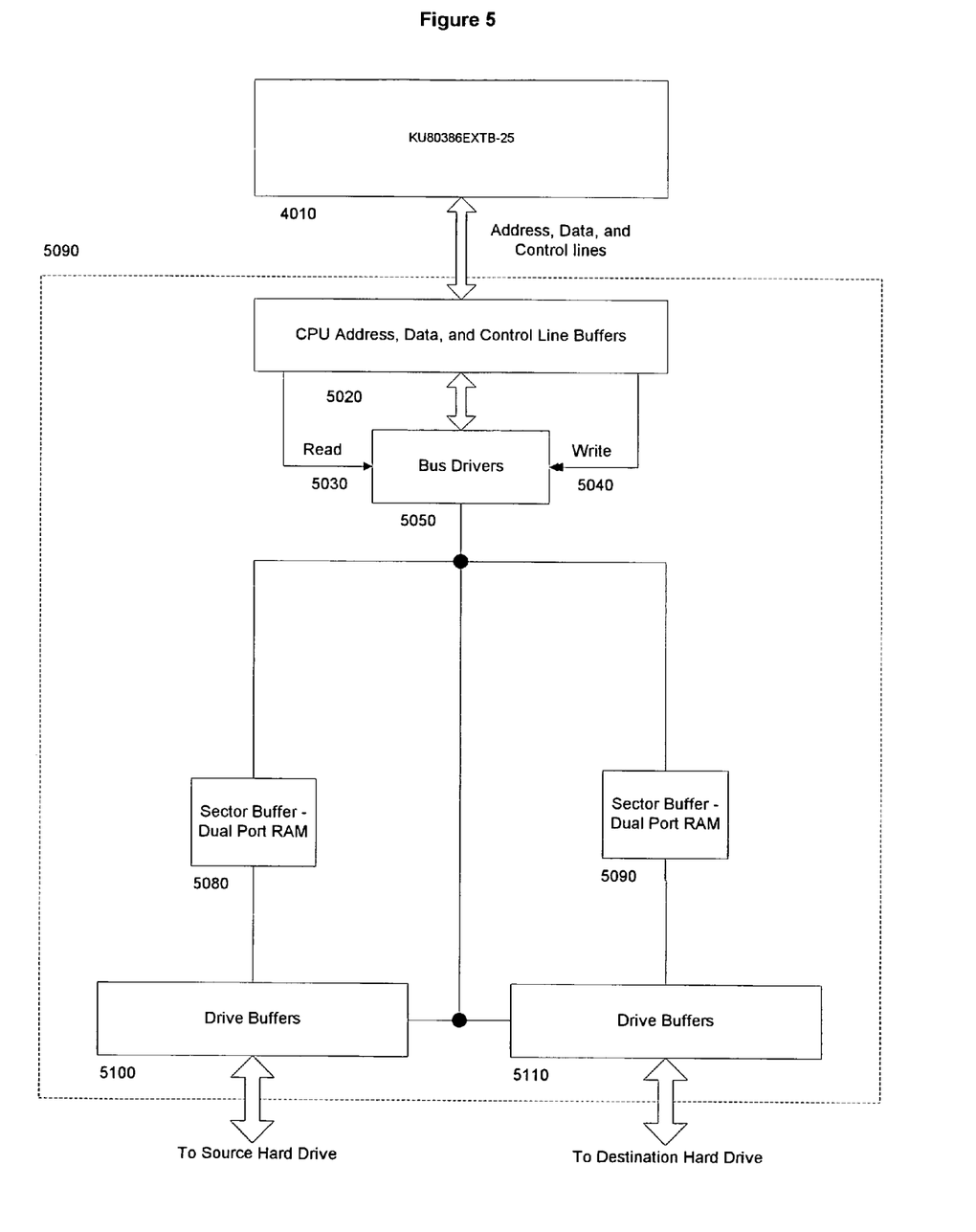
FIG. 5 is diagram graphically illustrating the functionality of portions of the copying device shown in FIG. 4.

FIG. 5 is an illustration of a block diagram of copying device that incorporates drive restore logic and supporting circuitry. Our device uses an Intel 80386 EX embedded processor 4010 for its main control and logic function. This version of Intel's 80386 processor is optimized for embedded applications. The highly integrated design of this processor means that very little additional circuitry is necessary to create a small, dedicated computer system. Some static RAM is provided in 5040, which is used for temporary program and data storage. 5050 is an EPROM that holds the code necessary to initialize and run the processor. Timing is generated by a 50 MHz crystal oscillator, 5070.

The 80386EX 4010 has I/O pins available that may be used to connect additional devices. Three of these pins are used to power LED status indicators 5020 in order to provide feedback to a user. Another of these I/O pins, used as an input, may be used to connect a key lock 5030 to the processor.

A Programmable Logic Device, or PLD, is used to integrate numerous logical devices into a single chip 5090. Configuration data for the PLD is stored in a configuration ROM 5080. Timing for the PLD is generated by a 50 MHz crystal oscillator, 5070. When the PLD is reset, it automatically tries to load configuration information from its ROM. When configuration is complete, this single chip 5090 can be viewed as having all of the functionality shown in FIG. 6.

FIG. 5 shows a breakdown of the functions implemented by the PLD 4090. The address, data, and control lines from the processor 4010 are routed to the PLD. They are then buffered and latched in 4020 as necessary to reduce the electrical load on the processor and to stabilize the signal timing. Buffered read 4030 and write 4040 signals control the direction of the bus drivers shown in 4050. These buffers help control the data flow and distribution of the address and data busses from the processor to other functions in the PLD.

Buffering and signal conditioning for the Source Drive is provided by the Drive Buffers in 5100, making this the Drive Interface. Through the Bus drivers 5050 the processor can directly read and write to the Drive Interface. Another way that the processor and the Drive may communicate is through the Dual Ported RAM Sector Buffer 5080. This allows the drive to write one sector's worth of data to RAM at high speed, while the processor performs other tasks. By allowing the operations to overlap in this fashion, the processor is not restricted to running at the speed of the drive, and is free to handle other functions until it needs the data in the Sector Buffer.

Similarly, buffering and signal conditioning for the Destination Drive is provided by the Drive Buffers in 5110, making this the Drive Interface. Through the Bus drivers 5050 the processor can directly read and write to the Drive Interface. Another way that the processor and the Drive may communicate is through the Dual Ported RAM Sector Buffer 5090. This allows the drive to read one sector's worth of data from RAM at high speed, while the processor performs other tasks. By allowing the operations to overlap in this fashion, the processor is not restricted to running at the speed of the drive, and is free to handle other functions until it needs the data in the Sector Buffer.

The 80386EX processor 4010 has a UART built in that may be used for serial communications. For versions of our device that require such communication capabilities, the UART is connected to an RS-232 transceiver 4060. This part not only buffers the signals, it also generates the necessary voltages required for RS-232 communications. A standard DB9 connector 4120 allows our device to be connected to a computer using a standard DB9 male to female serial cable.

In the preferred embodiment, the goal of making this device foolproof for use by an untrained person is accomplished in a number of ways. The first is that the device is controlled by a single switch, such as Key Lock 4030. This switch has only two choices, on and off. When switched on, the device starts operation and provides any required feedback to the user through one or more indicators, such as LEDs 4020. Under normal circumstances, the only indicator that the user need be concerned with is the "Operation Complete" indicator. Additional indicators may be available for such error conditions as "Destination Drive Too Small" or "Copy in Progress."

For additional detailed status, a printer may be connected to the device through communication port 4120. Information sent to the printer may include Drive identification information to uniquely identify the drive being copied. Should any errors occur, such as a bad sector on the Source disk, the sector number may be printed.

Should an unreadable sector be identified on the Source drive, something still must be written to the Destination drive. In the case of this type of error, our device writes a standard, predefined bit pattern to the corresponding area on the Destination drive.

Figure 3:
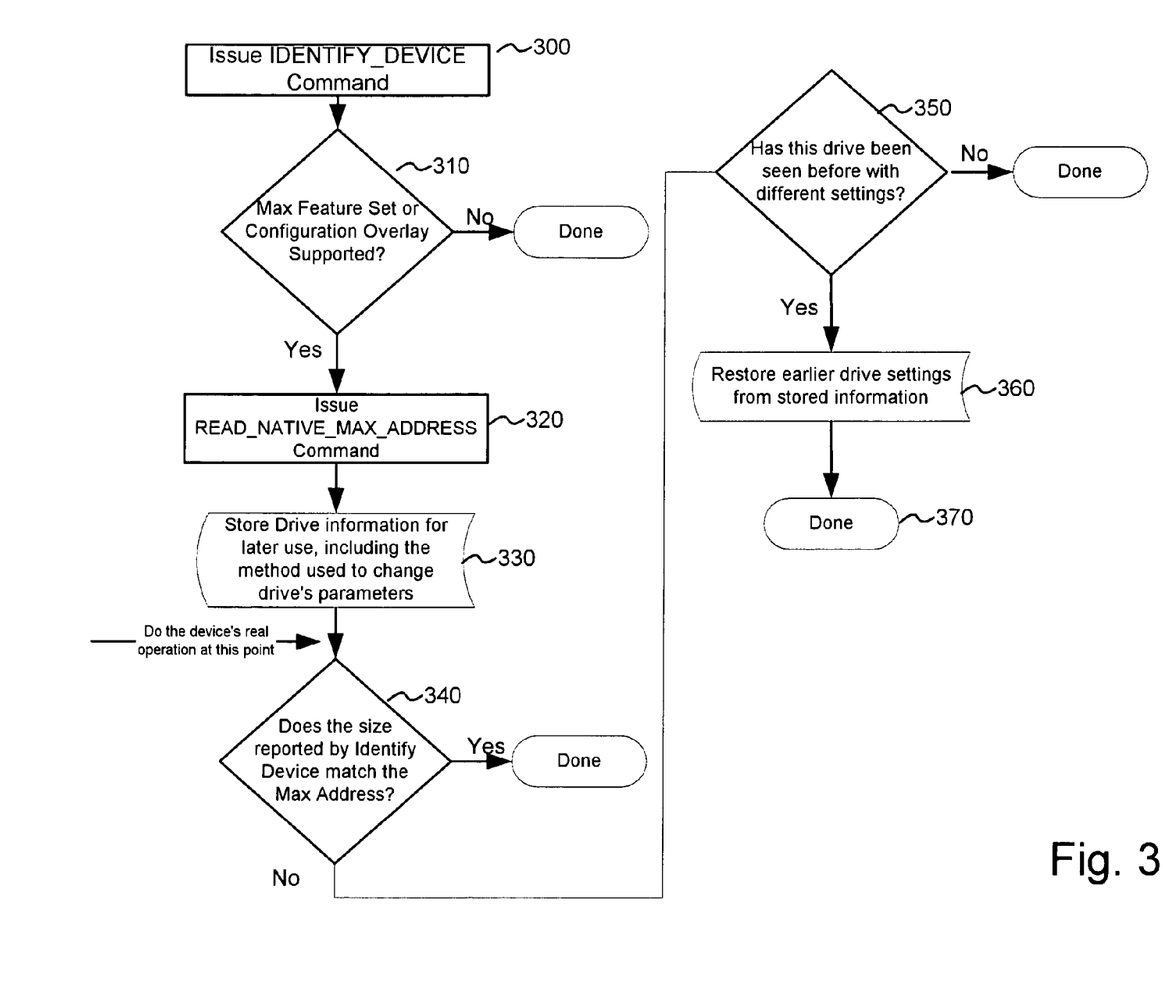
FIG. 3 is a flow chart illustrating the logic in determining full drive size.
Figure 4:
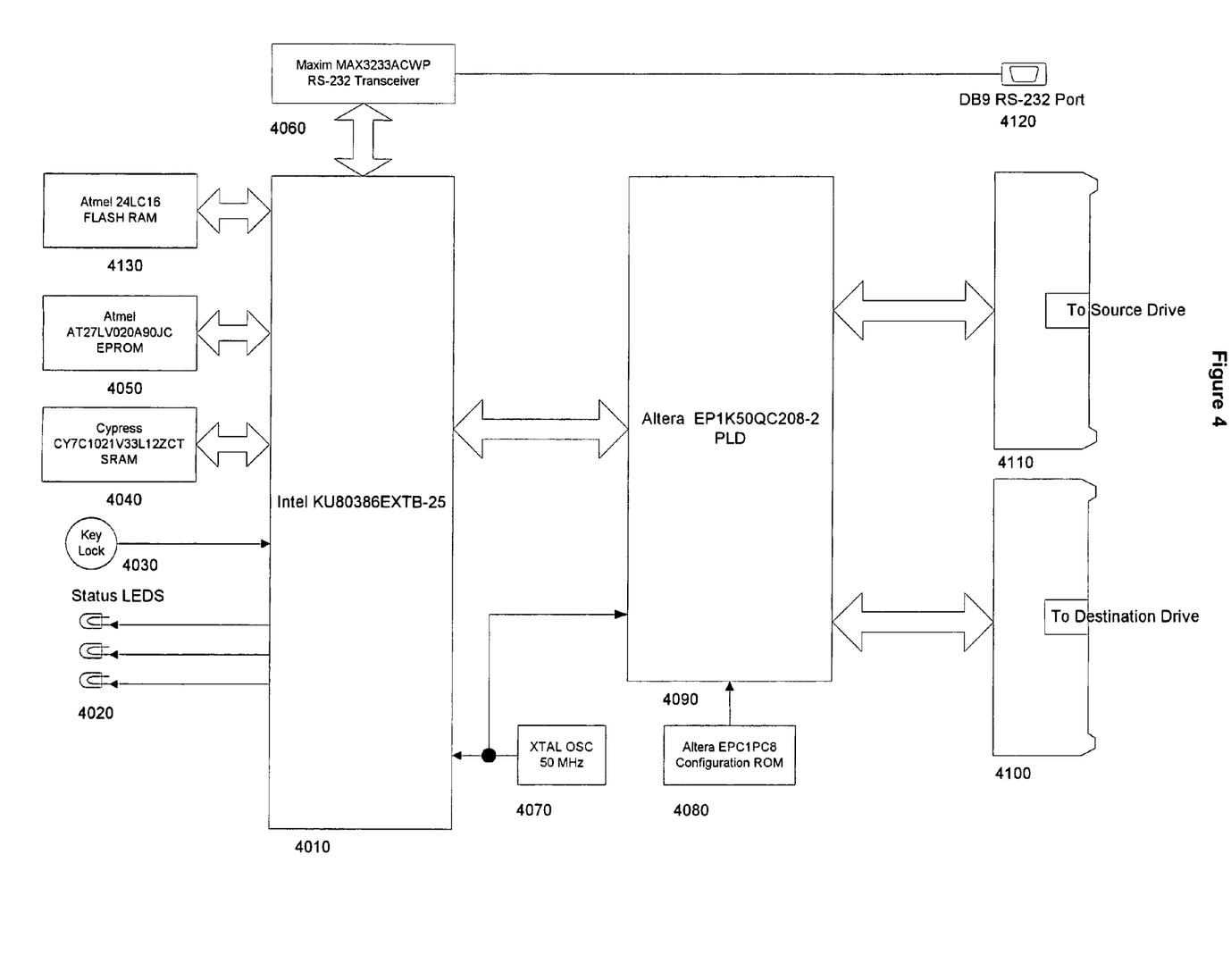
FIG. 4 is block diagram illustrating a copying device of FIG. 9 in more detail.

The logic for making use of the FLASH RAM is shown in FIG. 3. The Drive is interrogated using the IDENTIFY_DEVICE command 300. If the drive does not have the ability to hide data, there is no need to make any changes to the Drive parameters, and no need to restore them later. If, however, the Drive is capable of hiding data, the true size of the drive is determined by issuing the READ_NATIVE_MAX_ADDRESS command 320.

The information collected about the Drive's settings and information about the method to be used to make any hidden data available is stored in FLASH RAM 330. The copying device is now free to perform its operation. When the copy is complete, a check is made to determine if the device might need to change the Drive's settings back to their original configuration 340. If the stored Drive size does not match the Drive's current size, another check 350 is performed to see if the copying device has been presented with this Drive before. This could indicate a possibility that a power failure had left the drive in an altered state. If this is determined to be the case, the Drive's parameters are restored from the value stored in FLASH RAM 360.

Another Example of a Restoring Device

Another device that can make use of the our Drive Restore invention but uses it in a slightly different way is device called NoWrite, as described in U.S. patent application Ser.

No. 09/961,417. This device provides a write protection feature for computer long-term storage devices, such as hard drives.

A device for copying drives, as described earlier, is in full control of the copying process. It determines when and if to change any Drive parameters, and can determine when to change them back. NoWrite operates in a different manner. It plugs between the Host computer and the Drive, and only allows those commands to pass to the drive that are considered safe, in that they don't make any permanent changes to the data on the drive.

While it is important to protect the data on the drive, in many cases it is equally important to be able to find and examine any hidden data on the drive. In order for this to be done safely, NoWrite would need to store the original Drive parameters to FLASH RAM before allowing any changes to the Drive Parameters that might become permanent. Unlike a copying device that knows when to restore the original settings, a device like NoWrite has no way to determine when the changed settings are no longer necessary. This increases the likelihood that the drive could be left in a condition different than when it was first connected.

Figure 6:
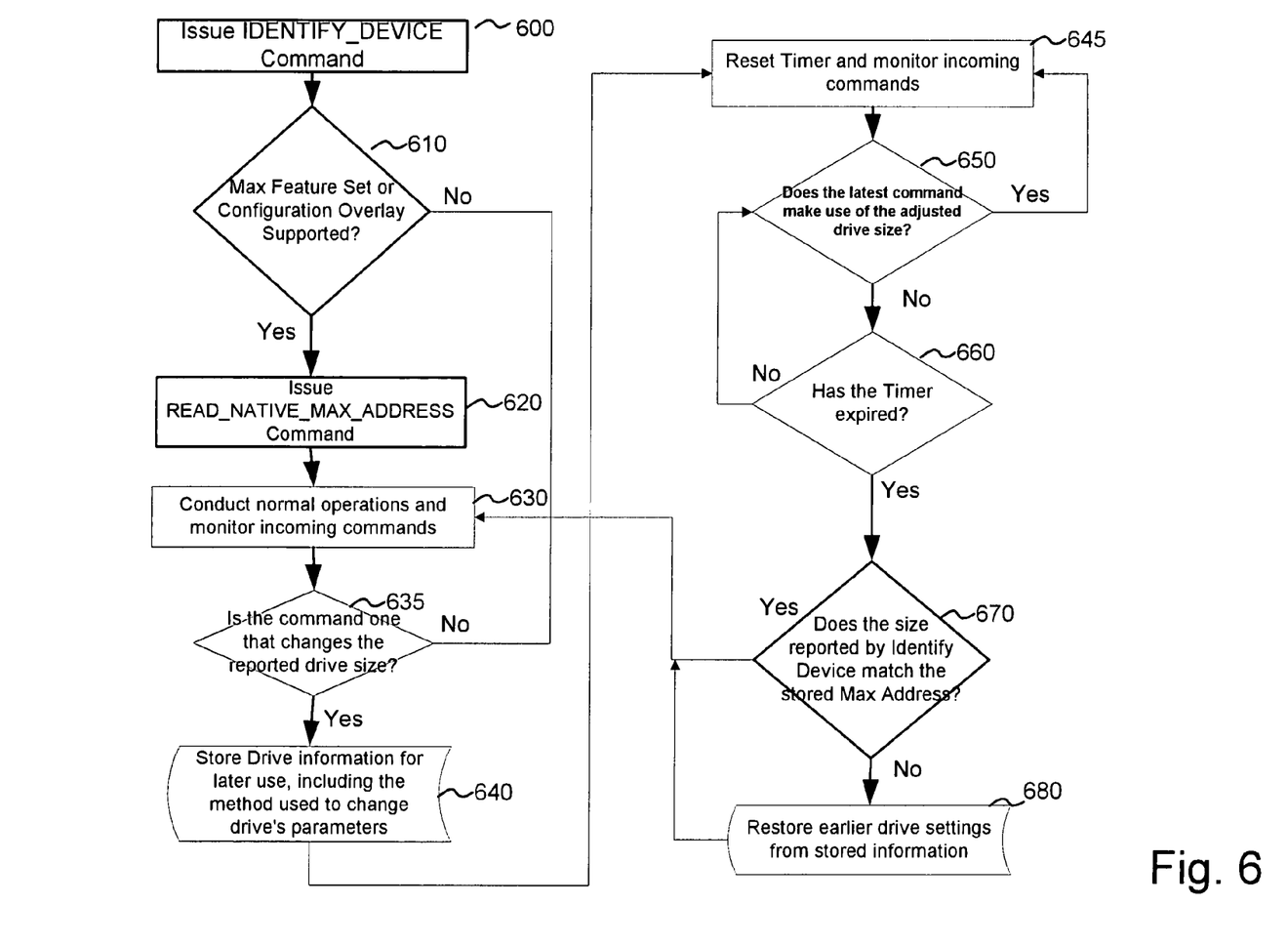
FIG. 6 is a flow chart illustrating the logic in determining when to restore temporarily changed drive parameters.

FIG. 6 illustrates the logic used in this device for typical usage to save and restore drive parameters, in order to allow a host computer to have access to all of the data on the drive. This device does not have any way to know in advance when a session will be complete or when it will be turned off. As such, there is no external condition that indicates when a drive should be restored to its initial condition. The logic in FIG. 6 shows one solution to this problem.

On power up 600, an IDENTIFY_DEVICE command is issued to the drive. The information returned by the IDENTIFY_DEVICE command is checked 610 to see if the drive supports ways to hide data. If the drive has the potential to have hidden data, a command is issued to find out the true size of the drive 620. At this point, the device has enough information to begin normal operations 630.

When a command is detected 635 that attempts to make a change to the reported drive size, information from the IDENTIFY_DEVICE record and the true drive size are stored in FLASH 640 for later use. The command is allowed to complete, potentially changing the reported size of the drive. The device then starts a timer 645 to keep track of time elapsed since a command last tried to make use of the data exposed by the changed drive size. If a command comes in that makes use of the newly exposed data, the timer is reset and the device continues monitoring the incoming commands.

After a preset amount of time passes without any commands trying to access the newly exposed data 660, the device will initiate the sequence to restore the drive to its previous state using the information stored in FLASH. If the currently reported size of the drive does not match the stored size of the drive 670, the values stored in FLASH are used to reset the drive to its earlier state.

Figure 8:
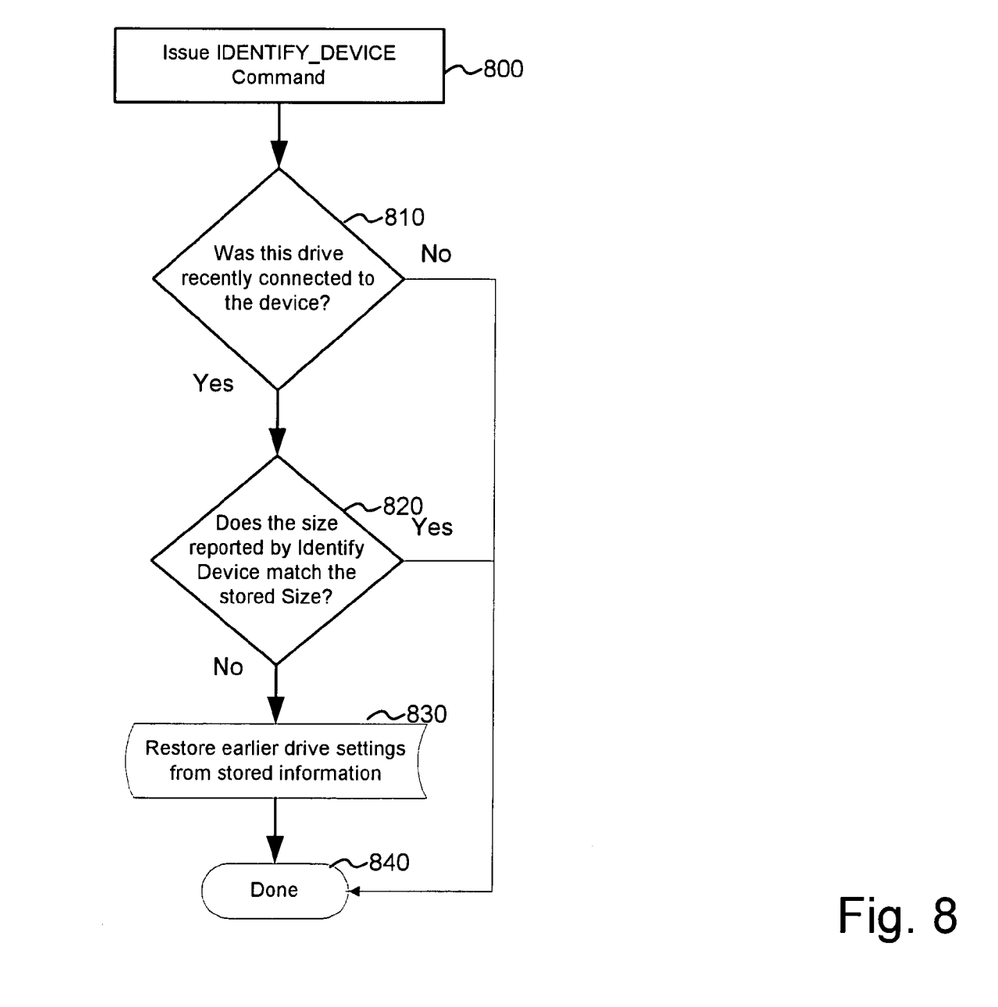
FIG. 8 is a flow chart illustrating the logic in auto restoring a drive

FIG. 8 shows the logic for automatically restoring a drive to its previously known good state. The information returned by the IDENTIFY_DEVICE command is checked against information previously stored in FLASH 810. If the device detects that it has stored information about this drive before, it checks to see if the current state of the drive matches the previous state 820. If the new and old values do not match, the device uses the data stored in FLASH to restore the drive to its previous settings 830.

It should be noted that the device may store information about all of the drives that it has previously seen, as limited only by the amount of FLASH RAM installed. Each time the device powers up, it may make a new entry in the database stored in FLASH about the current drive. This leads to the case where it is possible for the same drive to have multiple records with multiple values, given that the drive can be removed from the device and have parameters changed elsewhere. In this situation, the Drive Restoration process may involve user input.

Using Serial port 425, the device may be connected to a PC. Using serial communications software, such as HyperTerminal as shipped with virtually every Windows PC, a user may interact with the device. In the case where there are multiple settings stored for a single drive, the device may prompt a User as to which is the preferred setting to restore. This has the obvious advantage in that in case there is some confusion as to the 'correct' setting, a User has the opportunity to try any or all of the stored settings.

Our Current Invention as a Stand-Alone Device

Figure 1:
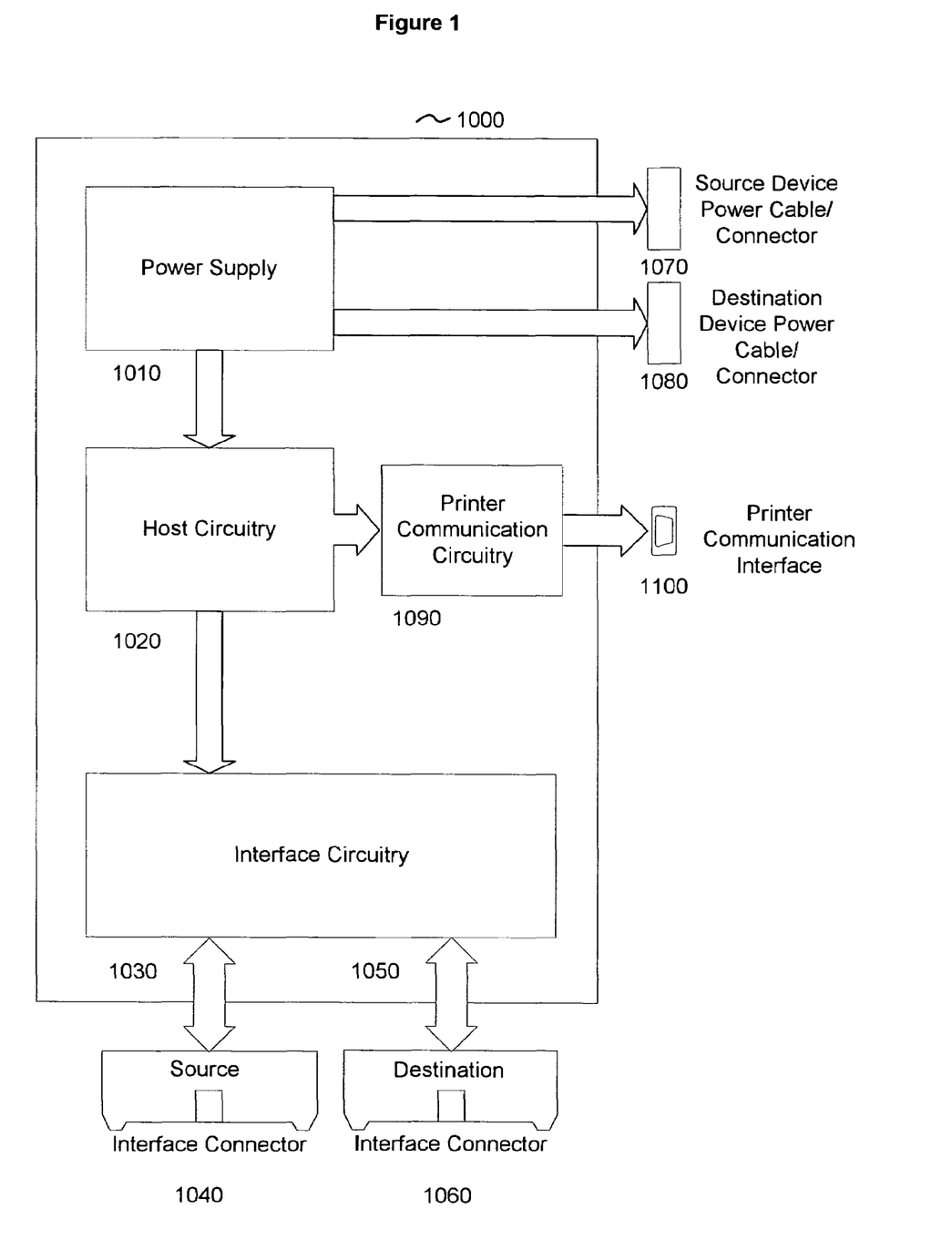
FIG. 1 is a diagram illustrating a copying device, which would be improved by our current invention.
Figure 2:
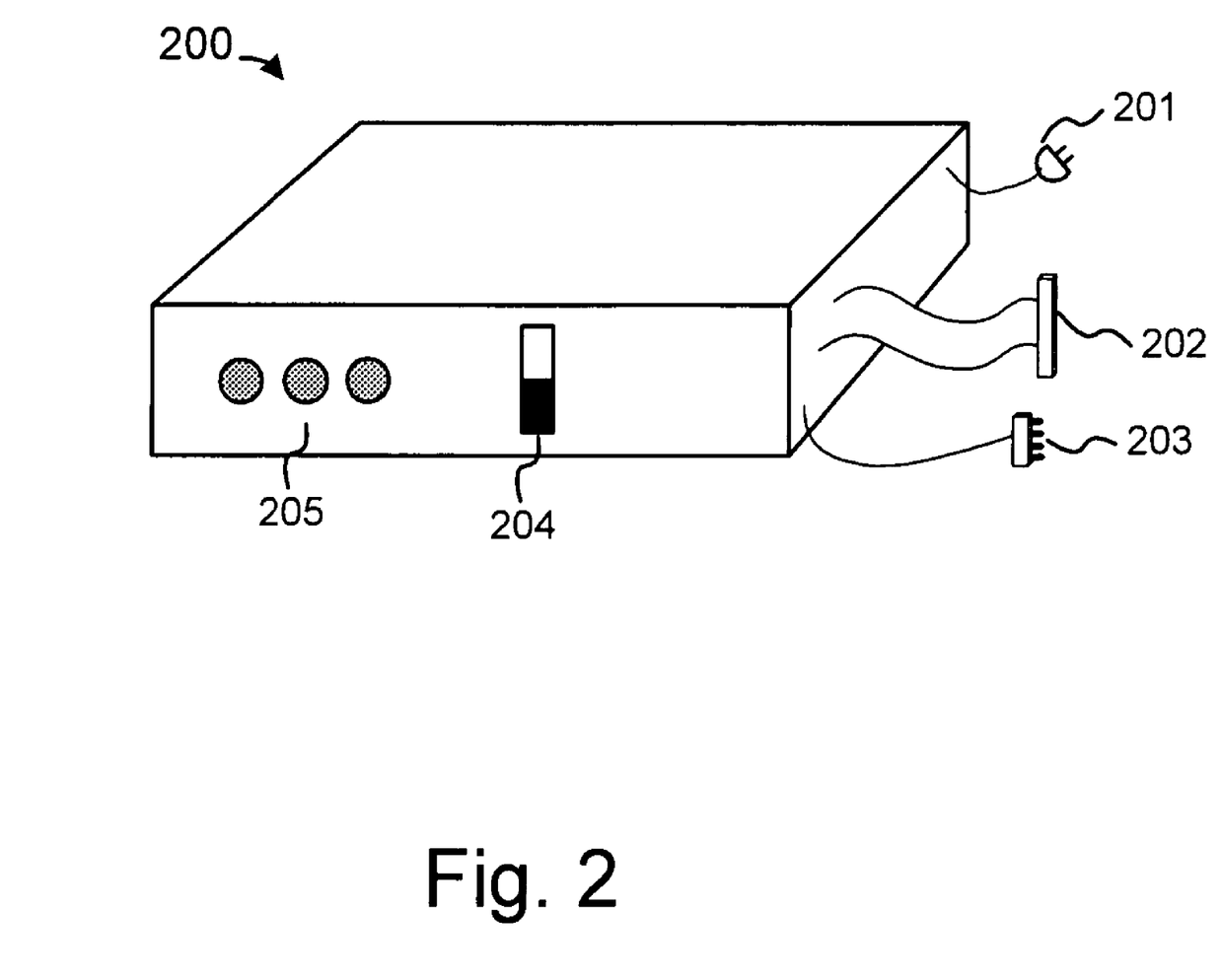
FIG. 2 is a diagram of external view of another implementation of the restoring device.

FIG. 2 is a diagram illustrating an external view of another implementation of a restoring device consistent with an aspect of the invention. As shown in FIG. 2, the external portion of restoring device may include a power cord with a wall socket 201, an IDE drive cable 202, a drive power cord 203, an on/off switch 204, and LED status lights 205. A target drive may be connected to the drive power cord 203 and drive cable 202.

The following description is from the perspective of a user when using our current invention on a detached hard drive. A user begins by plugging socket plug 201 into a power supply and ensures that switch 204 is set to the "off" state. The IDE drive cable 202 is plugged into the target drive, and the drive power cord 203. The user may then turn switch 204 to the "on" position. In response, restoring device will power on and process the drive in a manner similar to that described above with respect to FIG. 3. When restoring device has finished processing the drive, it signals completion via LED status lights 205. In addition the LED lights 205 may signal the status of the drive, that is whether it is in it's original state or not. When the device has signaled it has finished processing the target drive the user may turn switch 204 to the "off" position and disconnect the restoring device and the target drive.

User Interface

There is a possibility that a long-term storage device, such as a drive, makes use of a password to prevent changes being made to its parameters. If a Drive makes use of this password feature, a device, such as a copying device, may not be able to access all of the drive's data. Using an indicator, such as an LED, our invention could visually indicate this condition to a user.

One feature of our invention is its ability to indicate to a user the current state of the storage device. Using an indicator, such as an LED, our invention could visually show a user whether the storage device is in its original configuration or its modified condition.

Auto-Restore After Power Loss

Another variation is that the FLASH could be removable, such as a compact FLASH card, so that a database of drives operated on by our current invention, could be moved from device to device. This would be useful in the event that a device that contained our current invention failed, the drive data could be easily and quickly moved to another working device.

Stand-Alone Devices

Another iteration consistent with our current invention involves a stand-alone device that is physically connected to a target hard drive. The device would store the hard drive's unique identifier and associated information. The device would be connected to other computer devices or systems through a standard communications cable and thus be able to be queried for this information.

Another iteration involves a stand-alone device that is physically connected to a target hard drive. The device would store the hard drive's unique identifier and associated information. It would determine if there was a hidden area on the drive, and if so write commands to the drive's controller to enable the hidden area to be read. Additionally, upon command this device would reset the drive's controller to a previous state.

SUMMARY

As described above, a restoring device is physically connected to a storage device. The restoring device issues commands to open hidden areas on a storage device and subsequently restore the device to its original condition. An embedded processor within the restoring device controls functionality of the restoring device. The functionality of the embedded processor can be programmably modified to allow for a number of different possible restoring options.

Although the restoring device has been primarily described as restoring hidden areas, one of ordinary skill in the art will appreciate that the restoring device could instead or additionally modify, save and restore any information held by a storage device controller.

It will be apparent to one of ordinary skill in the art that the embodiments as described above may be implemented in many different forms of software, firmware, and hardware in the implementations illustrated in the figures. The actual software code or specialized control hardware used to implement aspects consistent with the present invention is not limiting of the present invention. Thus, the operation and behavior of the embodiments were described without specific reference to the specific software code, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The foregoing description of preferred embodiments of the present invention uses the term "processor", but this term is not intended to limit the invention to a precise form. One skilled in the art will appreciate that a processor may also be described as; circuitry and logic algorithms.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A stand alone, dedicated function restoring device for changing a state of a long-term memory device controller and subsequently restoring said storage device controller to said storage device controller's original state comprising:

an interface for connecting to a storage device;
and memory to store critical data from the storage device;
and a processor coupled to the interface and the memory, the processor issuing queries and commands to the storage device controller,
the processor storing all or part of the response in the memory, upon command the processor issues commands to restore the storage device controller to its original state,
wherein the storage device is operating system independent.

2. The restoring device of claim 1, wherein after querying the storage device's controller the processor issues commands to enable a host to read hidden data from the storage device.

3. The restoring device of claim 1, wherein the interface is an integrated device electronics (IDE) interface for a disk drive.

4. The restoring device of claim 3, wherein the processor issues commands to retrieve the storage device's unique identification number and reported drive size from a device identification data packet and stores this information in the memory.

5. The restoring device of claim 3, wherein the processor issues further commands to the storage device to obtain data to allow the processor to analyze the full size of the storage device and subsequently issue commands to change the drive size reported by the storage device's controller in a device identification data packet, to enable a host to read data from the entire drive.

6. The restoring device of claim 3, wherein the processor, upon command, issues commands to restore the drive size reported by the storage device's controller in a device identification data packet, to its original state.

7. The restoring device of claim 3, wherein the processor, upon command, issues a command to switch an Enable/Disable Address Offset Mode.

8. The restoring device of claim 3, wherein the processor, upon command, issues a command to restore an Enable/Disable Address Offset Mode to its original state.

9. The restoring device of claim 1, wherein the memory is removable, such as a compact Flash card.

10. The restoring device of claim 1, wherein the memory is non-volatile memory.

11. The restoring device of claim 1, further comprising: an interface to communicate to a user the current state of the storage device.

12. The restoring device of claim 1, further comprising: an interface to communicate to a user that the storage device is password protected.

13. A stand alone, dedicated function restoring device for changing a state of a long-term memory device controller and subsequently restoring said storage device controller to said storage device controller's original state comprising:

means for interfacing with a storage device;
means for storing information from the storage device controller;
means for querying and issuing commands to the storage device controller;
means for restoring the storage device's controller to said storage device controller's original state,
wherein the storage device is operating system independent.

14. The restoring device of claim 13, further comprising: means to enable a host to read data from hidden areas on a storage device.

15. The restoring device of claim 13, further comprising; means to communicate information to a user.

* * * * *

UNITED STATES PATENT AND TRADEMARK OFFICE
Certificate

Patent No. 7,143,248 B2

Patented: November 28, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Steven Bress, Germantown, MD (US); and Mark Joseph Menz, Folsom, CA (US).

Signed and Sealed this Twentieth Day of September 2011.

MATTHEW M. KIM
*Supervisory Patent Examiner*
Art Unit 2186
Technology Center 2100